Figure 1:
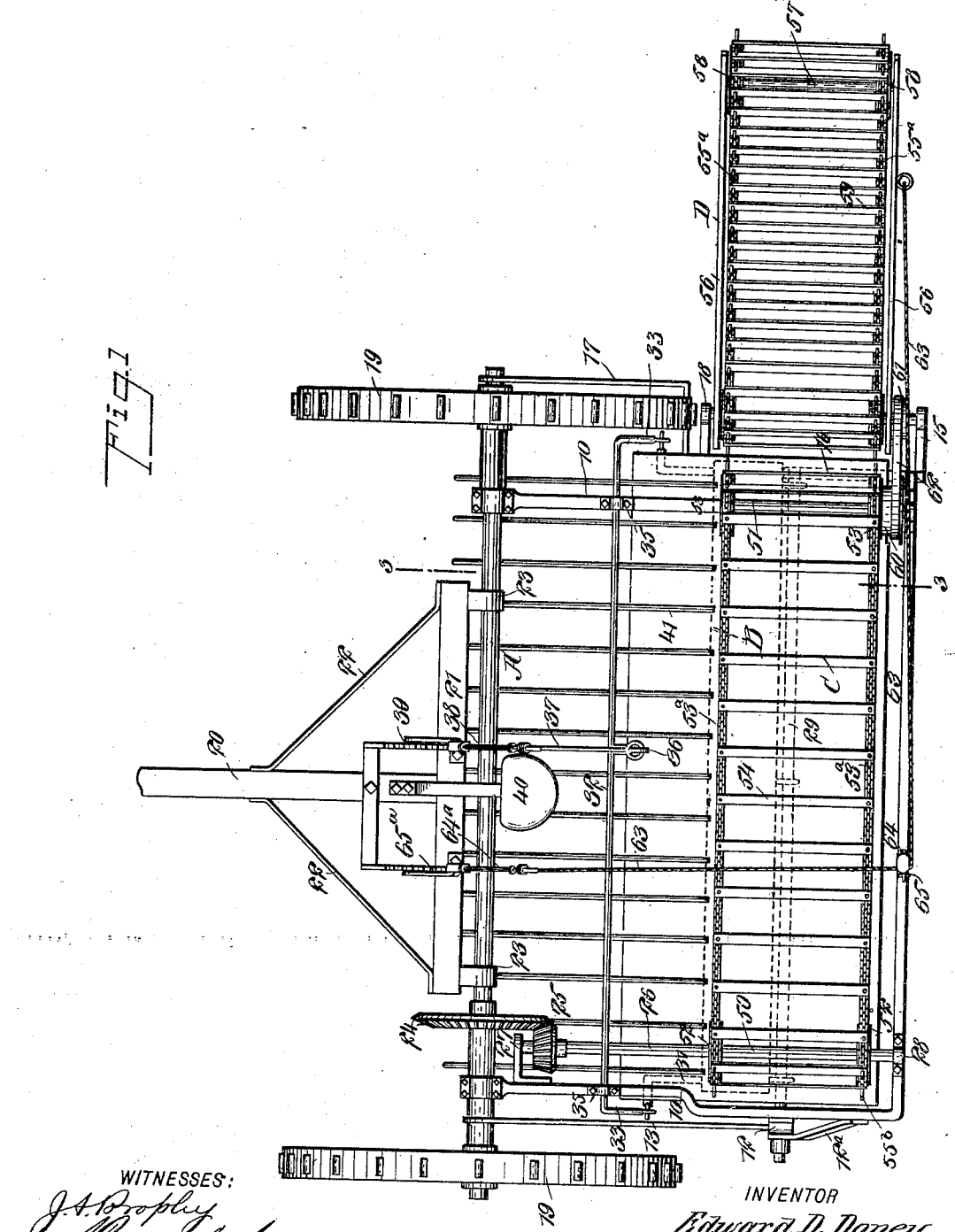

No. 709,756. Patented Sept. 23, 1902.
E. D. DONEY.
HAY RAKE AND LOADER.
(Application filed Sept. 3, 1901.)

(No Model.) 4 Sheets—Sheet 1.

WITNESSES:
J. A. Brophy
Fred Acker

INVENTOR
Edward D. Doney
BY
ATTORNEYS

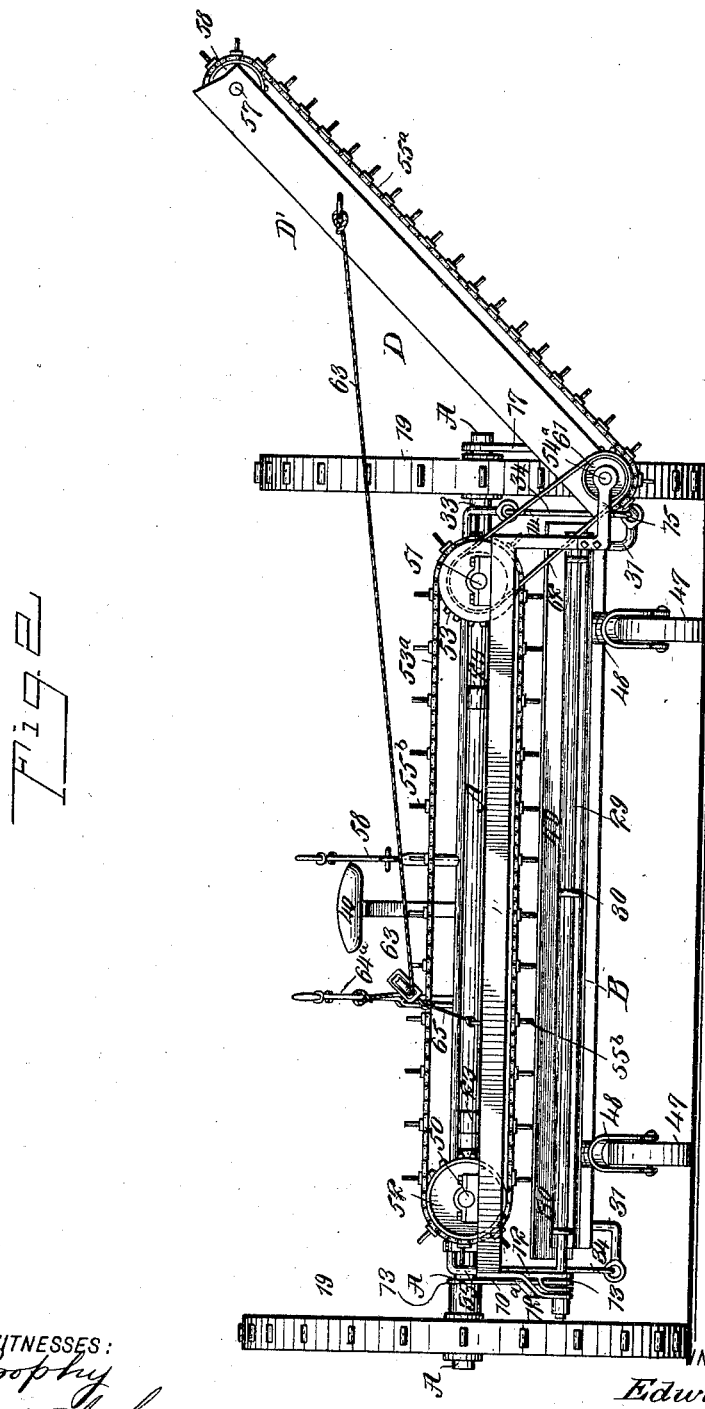

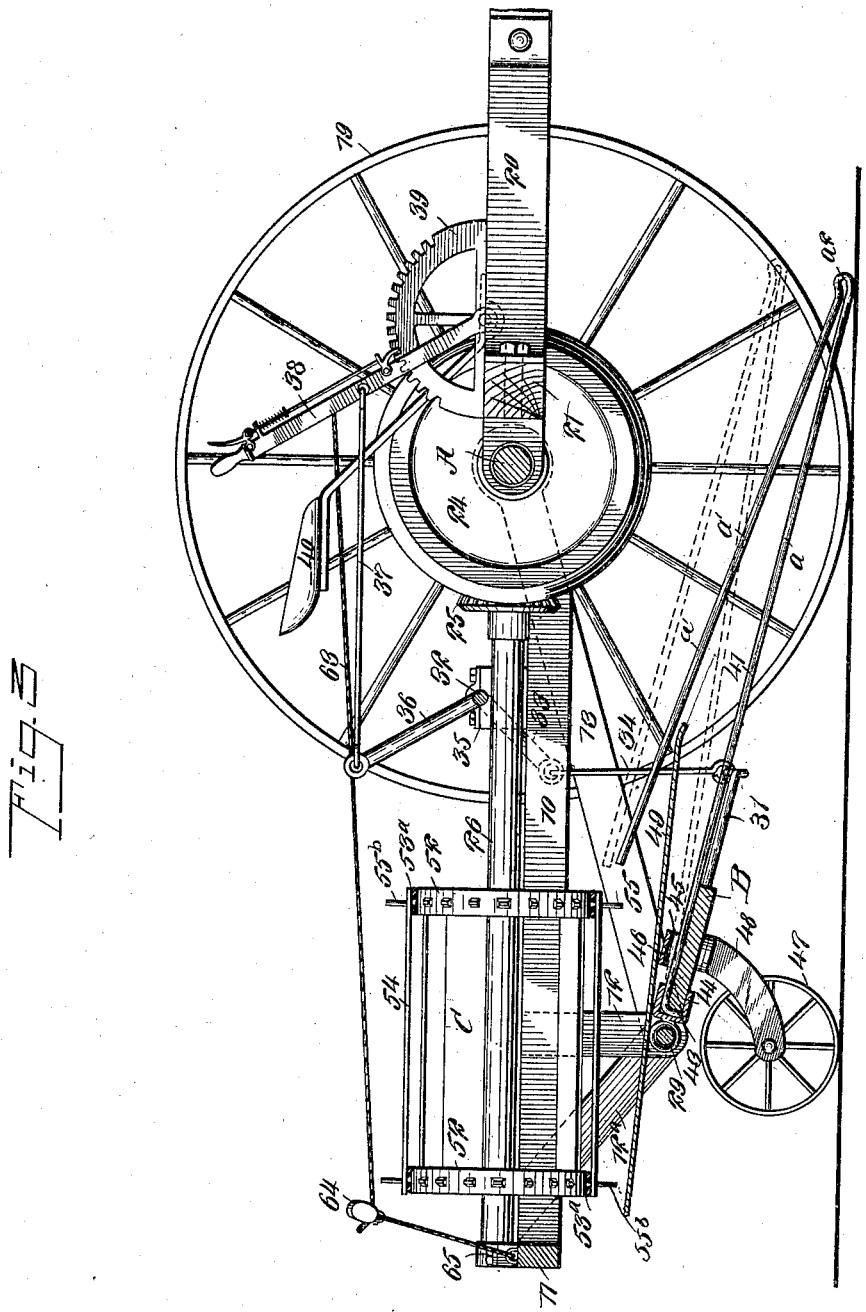

No. 709,756. Patented Sept. 23, 1902.
E. D. DONEY.
HAY RAKE AND LOADER.
(Application filed Sept. 3, 1901.)
(No Model.) 4 Sheets—Sheet 4.
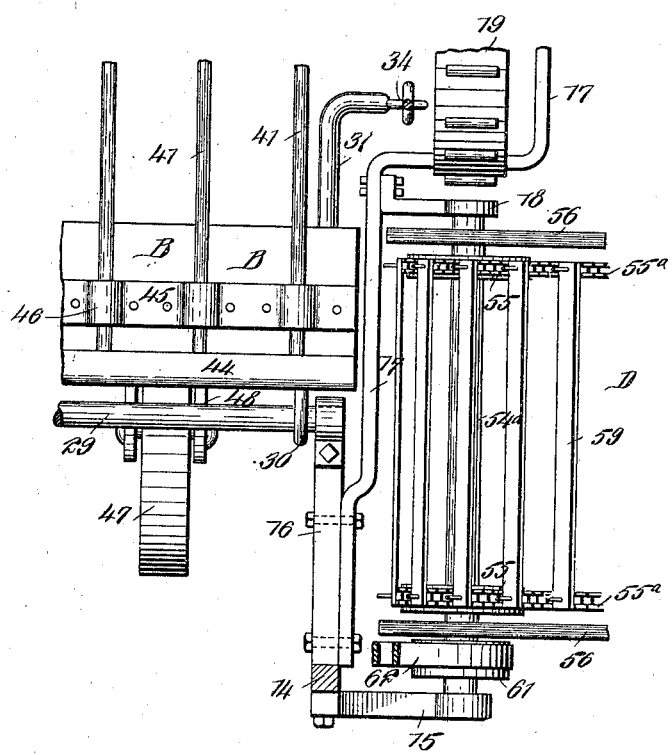
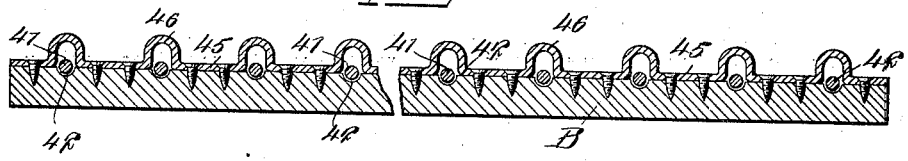
WITNESSES:
INVENTOR
Edward D. Doney
BY
ATTORNEYS

UNITED STATES PATENT OFFICE.

EDWARD D. DONEY, OF OVANDO, MONTANA.

HAY RAKE AND LOADER.

SPECIFICATION forming part of Letters Patent No. 709,756, dated September 23, 1902.

Application filed September 3, 1901. Serial No. 74,087. (No model.)

*To all whom it may concern:*

Be it known that I, EDWARD D. DONEY, a citizen of the United States, and a resident of Ovando, in the county of Powell and State of Montana, have invented a new and Improved Hay Rake and Loader, of which the following is a full, clear, and exact description.

The purpose of the invention is to provide a rake with a side loading attachment, which attachment receives the hay from a conveyer carried by the body of the machine, the said conveyer having the hay delivered thereto by a series of rake-teeth.
A further object of the invention is to provide a hay loading or elevating attachment which may be raised or lowered without hindrance to the elevator belt or apron, and also to provide means for raising and lowering the rake-head so that large articles may be readily passed.

Another object of the invention is to so place the rake-teeth in the rake-head that each tooth is capable of independent vertical movement, thus enabling the rake to pass without injury over rough or stony ground.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.
Figure 1 is a plan view of the machine. Fig. 2 is a rear elevation of the same. Fig. 3 is a transverse section taken on the line 3 3 of Fig. 1. Fig. 4 is a detail plan view of a portion of the rake-head, showing the manner in which the teeth are placed therein, and also a plan view of the inner end portion of the elevator; and Fig. 5 is a longitudinal vertical section through the rake-head and a transverse section through the rake-teeth.
A represents an axle which turns loosely in the forward portion of a frame, and the said frame at its forward portion has suitable bearing for the axle. The frame consists of two parallel side bars 10 and a rear bar 11, connecting the side bars. From the left-hand side bar a hanger 12 extends, and a second hanger 12$^a$ extends downward and forward from the same side bar, the lower ends of the two hangers being in the same horizontal plane. These hangers are located near the rear portions of the left-hand side bar 10, and at the right-hand rear end of the frame a vertical member 14 is provided, to which a horizontal arm 15 is secured, which extends outward in direction of the right-hand side of the machine, as is shown in Figs. 2 and 4. The said vertical member 14 of the frame is provided with a forwardly-extending horizontal arm 16, (shown best in Fig. 4,) and one end of a shaft 29 is secured in the forward end of the arm 16, while the other end of the shaft is made to pass through the lower portions of the hangers 12 and 12$^a$. The left-hand end of this shaft is more or less strengthened or supported by a brace-arm 13, which enters the bearing of one of the hangers and extends to the axle, around which it is loosely passed, as is shown in Fig. 1. The right-hand end of the frame is strengthened to a greater or less extent by means of a brace-rod 17, attached to the outer face of the horizontal arms 16, and this brace-arm 17 extends forward and then outward to the right-hand side of the machine and then forwardly again to a loose connection with the right-hand end of the axle A, the said axle having supporting-wheels 19 secured thereto at its ends. An outwardly-extending horizontal bearing-arm 18 is secured to the brace-bar 17, as shown in Figs. 1 and 4, and this horizontal bearing-arm 18 is parallel with the rear arm 15, supported by the frame of the machine. A pole or tongue 20 is attached to a cross-bar 21 at its rear, said cross-bar 21 being braced by rods 22, attached to the ends thereof and to the pole or tongue, as shown in Fig. 1. This cross-bar 21 is pivotally mounted on the axle A by means of suitable eyes 23 or their equivalents.

A bevel-gear 24 is secured on the axle A. This bevel-gear meshes with a pinion 25, and this pinion is secured on a shaft 26, held to turn at its forward end in a hanger 27, secured to the left-hand side member of the frame of the machine. The rear end of the shaft is held to turn in a suitable bearing mounted upon the rear member of the said frame, as is best shown in Fig. 1.

A shaft 29 is adapted to support a rake-head B, and this rake-head is pivotally connected with the shaft 29 by eyes or like devices, as is shown in Fig. 4. An arm 31 is pivotally extended from each end of the rake-head, and these arms are connected by links 34 with crank-arms 33, located at the ends of a shifting shaft 32, the said shaft being mounted to turn in bearings 35 on the side members of the frame. This shifting shaft is provided between its ends with a third crank-arm 36, and this crank-arm has a link connection 37 with a lever 38, fulcrumed upon the cross-bar 21 of the pole or tongue 20. The said lever 38 is provided with the usual thumb-latch for engagement with a rack 39, likewise carried by the cross-bar of the pole or tongue. The driver's seat 40 is connected by a suitable support to the tongue or pole 20, as is shown in Fig. 1.

Each of the rake-teeth 41 comprises two members—a lower member $a$ and an upper member $a'$ at an angle to the lower member. The rake-teeth are made of spring-wire of suitable gage, and where the two members connect at the forward ends of the teeth the said forward ends are curved upward from the ground, as shown at $a^2$ in Fig. 3, so that the teeth will not dig into the ground. The lower member $a$ extends farther rearward than the upper member, and the upper member diverges from the lower member as it extends rearward, as is also shown in Fig. 3. The lower member $a$ of each tooth 41 lies in a transverse recess 42, produced in the upper face of the rake-head, as is illustrated in Fig. 5, and the rear ends 43 of these lower members $a$ of the rake-teeth are bent downward at the rear of the rake-head and are held in place by a shield 44, also located at the rear of the rake-head, as is shown in Fig. 3. A metal strip 45 is secured to the upper face of the rake-head, extending longitudinally thereof, and this strip is secured to the rake-head at each side of the lower member $a$ of a tooth. This strip is further provided with upwardly-arched sections 46, occurring above the transverse recesses 42 in the rake-head, as is shown in Fig. 5. Thus it will be observed that each tooth can independently rise and fall, so as to pass any small obstructions that may be encountered, and the rake-head, together with all of the teeth, may be simultaneously raised to clear a large obstruction by manipulating the lever 38, heretofore described. Caster-wheels 47 are pivotally attached, by means of their shanks 48, to the under face of the rake-head B and serve to hold the said rake-head in a downward and forward inclined position, as shown in Fig. 3.

A table 49 is located over the rake-head, extending rearward and forward therefrom, as is best shown in Fig. 3, and this table is preferably attached to the rake-head in any suitable or approved manner. Above this table 49 a conveyer C is located, extending from side to side of the machine at the rear. In the construction of this conveyer a drum 50 is preferably secured to the driving-shaft 26, and this drum carries sprocket-wheels 52 at its ends. A second drum 51 is mounted to turn on the right-hand side section of the frame, carrying at its ends sprocket-wheels 53, and endless chain belts $53^a$ are passed over the sprocket-wheels 52 and 53, as is shown in Fig. 1. These belts $53^a$ are connected by slats 54, and the said slats are provided with teeth $55^b$, extending from their outer faces at the ends, which teeth take hold of the hay delivered by the rake-teeth onto the table 49 and carry the hay toward the right-hand side of the frame, delivering it upon an elevator D at said right-hand side, as is shown in Figs. 1 and 2. In the construction of this elevator D a shaft $54^a$ is journaled in the arms 15 and 18, as shown in Fig. 4, the said shaft $54^a$ being provided with sprocket-wheels 55. Side bars or boards 56 are pivotally mounted on this shaft outside of the sprocket-wheels, and fenders may be attached to these side boards, if desired. At the outer ends of the side boards 56 a shaft 57 is journaled, and this shaft carries sprocket-wheels 58. Endless chain belts $55^a$ are passed over the sprocket-wheels 55 and 58, and these endless chain belts are connected by slats 59. The elevator apron or belt just described is driven by locating a pulley 60 at the rear end of the right-hand shaft 51 of the conveyer and passing a belt 62 over this pulley and over a corresponding pulley 61, secured to the rear end of the shaft $54^a$ of the elevator, as is shown in Figs. 1 and 4. The elevator is raised and lowered by attaching one end of a rope or chain 63 to the rearmost side bar of the elevator at a point between its center and upper end. This rope or chain is carried along the rear of the frame and over a pulley 64, attached to the frame by means of a strand of rope or a section of chain 65 or by a link. Said rope or chain 63 is carried from the pulley 64 to a lever $64^a$, fulcrumed upon the cross-bar 21 of the tongue 20, as is shown in Fig. 1, the said lever $64^a$ being provided with a suitable thumb-latch for engagement with a rack $65^a$.

It will be understood that the device in its entirety is a combination side-delivery hay rake and loader, and can therefore be used as a side-delivery hay-rake only by detaching the loading-elevator.

Having thus described my invention, I claim as new and desire to secure by Letters Patent—

1. The combination of a main frame, a wheeled rake-head connected therewith, means for adjusting said rake-head relative to said main frame, a table in operative relation to the rake-head, rake-fingers each having upper and lower members and said lower members connected to the rake-head and the upper members arranged to discharge a load to said table, horizontal shafts over said table, and a conveyer supported and driven by said shafts and arranged to sweep the table.

2. The combination of a wheeled rake-head, a substantially horizontal table supported by and arranged above said rake-head, double rake-fingers each having the lower member loosely connected to the rake-head and with the upper member arranged to extend over said table, a conveyer having teeth arranged to sweep the table, means for propelling the conveyer in a horizontal path, and means for adjusting the rake-head and the table relative to said conveyer.

3. In a hay rake and loader, a rake-head, teeth constructed of spring-wire carried by the said head, each tooth comprising a lower member and an upper member diverging from the lower member, each tooth having an upward bend where the members connect at a forward end of the tooth, the lower member of each tooth resting loosely in guide-recesses in the rake-head, a device for securing the rear ends of the lower members of the teeth to the rear portion of the rake-head, and a binding-strip extending from end to end of the rake-head over the lower members of the teeth, being secured to the said head at the spaces between the teeth, the said binding-strip having arched sections over each tooth, so that each tooth is capable of limited upward movement, as described.

4. In a hay rake and loader, a rake-head, teeth constructed of spring-wire carried by the said head, each tooth comprising a lower member and an upper member diverging from the lower member, each tooth having an upward bend where the members connect at a forward end of the tooth, the lower member of each tooth resting loosely in guide-recesses in the rake-head, a device for securing the rear ends of the lower members of the teeth to the rear portion of the rake-head, and a binding-strip extending from end to end of the rake-head over the lower members of the teeth, being secured to the said head at the spaces between the teeth, the said binding-strip having arched sections over each tooth, so that each tooth is capable of limited upward movement, a wheel-supported frame upon which the rake-head is pivotally mounted, and a shifting device carried by the said frame and connected with the rake-head, whereby the rake-head may be raised and lowered, and all of the teeth simultaneously raised and lowered, as described.

5. In a hay rake and loader, the combination, with a wheeled driving-axle, a frame supported thereon, a shaft extending from side to side of the frame, a drive-shaft extending from front to rear of the frame, and a driving connection between the drive-shaft and driving-axle of the frame, of a rake-head pivotally mounted on the shaft extending from side to side of the frame, the rake-head being provided with a series of spring-teeth capable of independent vertical movement, a table located over the rake-head, caster-wheel supports for the rake-head, a conveyer located over the said table and extending from end to end thereof, an elevator located at one side of the frame at one end of the conveyer, and means, substantially as described, for imparting movement to the conveyer and elevator aprons through the medium of the said driving-shaft, for the purpose set forth.

6. In a hay rake and loader, the combination, with a wheeled driving-axle, a frame supported thereon, a shaft extending from side to side of the frame, a drive-shaft extending from front to rear of the frame, and a driving connection between the drive-shaft and driving-axle of the frame, of a rake-head pivotally mounted on the shaft extending from side to side of the frame, the rake-head being provided with a series of spring-teeth capable of independent vertical movement, a table located over the rake-head, caster-wheel supports for the rake-head, a conveyer located over the said table and extending from end to end thereof, an elevator located at one side of the frame at one end of the conveyer, and means, substantially as described, for imparting movement to the conveyer and elevator aprons through the medium of the said drive-shaft, a shifting shaft mounted on the frame and connected with the rake-head, a lever connected with the shifting shaft, a pulley-controlled regulating rope or chain connected with the elevator, and a lever connected with the said pulley-controlled rope or chain, for the purposes set forth.

7. The combination of a wheeled axle, a frame, a pivotal shaft or rod supported by said frame, a rake-head connected to said shaft, a table over said rake-head and projecting in front and in rear of the same, rake-fingers connected to the rake-head and provided with upper members arranged to deliver to the table, horizontal conveyer-shafts mounted on the frame, a conveyer supported and driven by said shafts and arranged to travel lengthwise of the table and in a path crosswise of the series of rake-fingers, and means for adjusting said rake-head and the rake-fingers carried thereby.

8. The combination of a wheeled axle, a frame, a rake-head suspended from said frame and supported by ground-casters, a table over said rake-head, rake-fingers each having two members, one series of said members of the rake-fingers being loosely connected to the rake-head and the other members of said fingers arranged to extend over the table, rake-head-adjusting devices on said frame, and a conveyer mounted on the frame and arranged to travel lengthwise of the table.

9. The combination of a wheeled axle, a frame, a horizontal conveyer-driving shaft geared to said axle, another horizontal conveyer-shaft mounted on the frame, an endless conveyer fitted to said shafts and arranged to travel in a horizontal path, a rake-head and the rake-fingers below the conveyer mechanism, said rake-fingers having the upper members, a table supported between the conveyer and the rear ends of the upper members of the rake-fingers, said table extending in front and in rear of said rake-head, an inclined elevator having one end mounted on the frame and disposed in loading relation to the table and the conveyer, means for driving the elevator, and elevator-adjusting devices on the frame.

In testimony whereof I have signed my name to this specification in the presence of two subscribing witnesses.

EDWARD D. DONEY.

Witnesses:
L. S. JAKWAYS,
H. J. FAUST.